United States Patent [19]

Addis

[11] Patent Number: 4,647,889
[45] Date of Patent: Mar. 3, 1987

[54] ROTARY CONTROL HAVING VARIABLE DETENTS

[75] Inventor: John L. Addis, Beaverton, Oreg.
[73] Assignee: Tektronix, Inc., Beaverton, Oreg.
[21] Appl. No.: 798,657
[22] Filed: Nov. 15, 1985
[51] Int. Cl.$^4$ ............................................. H01F 7/08
[52] U.S. Cl. .................................... 335/253; 335/254
[58] Field of Search ............... 335/253, 254, 270, 272, 335/279

[56] References Cited

U.S. PATENT DOCUMENTS

| | | | |
|---|---|---|---|
| 3,344,378 | 9/1967 | Wilheluson | 335/272 |
| 3,855,560 | 12/1974 | Ward | 335/253 X |
| 3,934,216 | 1/1976 | Ward | 335/272 |
| 4,539,544 | 9/1985 | Rapp | 335/253 |

Primary Examiner—George Harris
Attorney, Agent, or Firm—Mark L. Becker; George T. Noe

[57] ABSTRACT

A rotary control having a variable detent is disclosed. The control, for electrical instruments and the like, includes a manually rotatable shaft to which a plate is coaxially mounted. The plate includes magnetizable flutes extending radially therefrom, each flute corresponding to a rotational stop position of the rotary control. Spaced adjacent the plate is a switchable electromagnet that forms a detent. A control switch in communication with the electromagnet selectably energizes it to engage magnetically the flutes successively as the shaft is manually rotated, stopping the rotary control at each rotational stop position. The switch also de-energizes the electromagnet so that the shaft may be continuously variable. A plurality of electromagnets can be positioned about a plate to vary the locations of the rotational stop positions. In a separate embodiment, a plurality of plates, each with an associated electromagnet, is mounted coaxially on the shaft.

12 Claims, 3 Drawing Figures

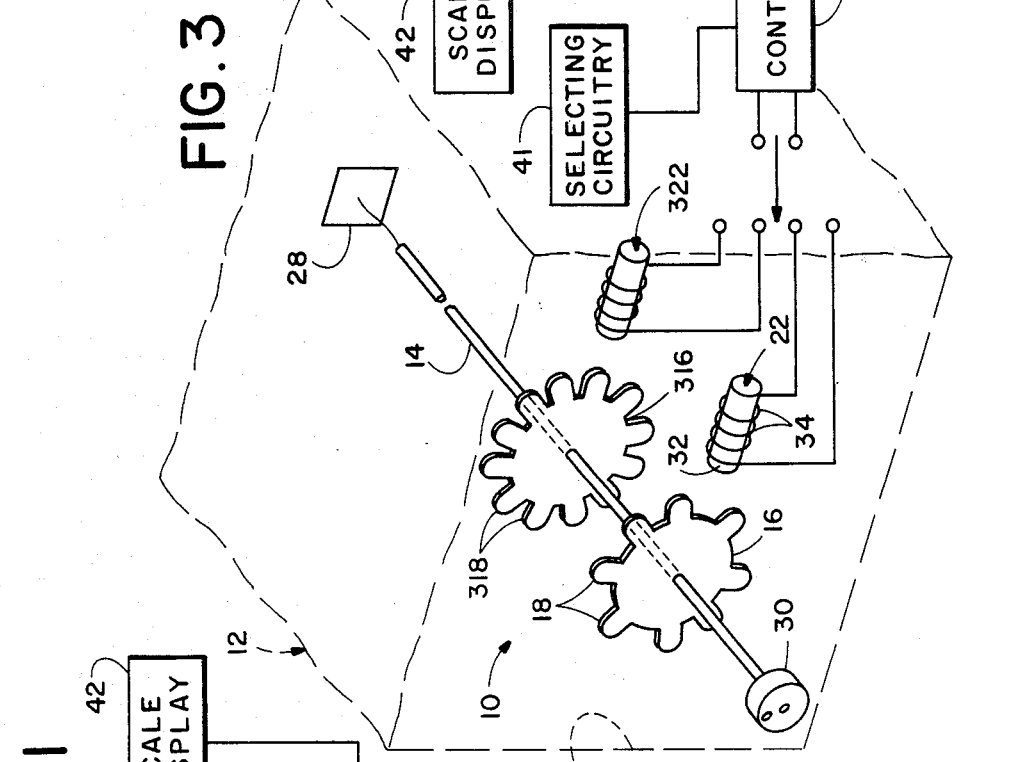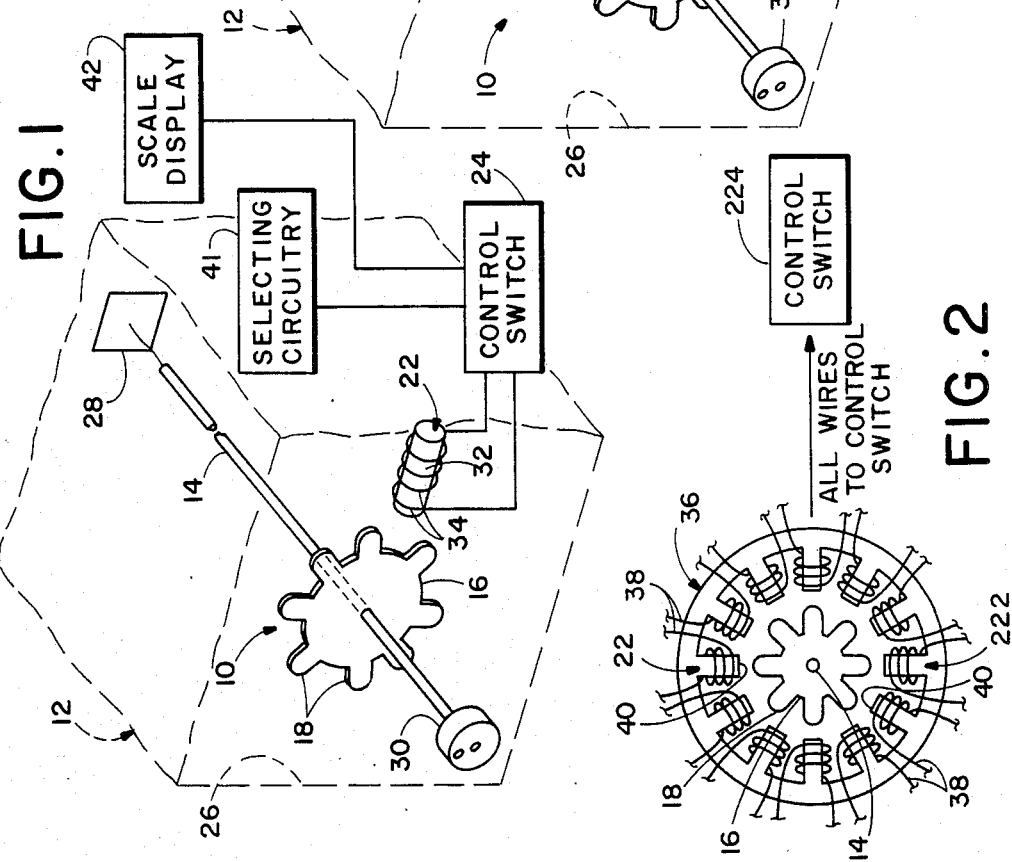

ROTARY CONTROL HAVING VARIABLE DETENTS

FIELD OF THE INVENTION

This invention relates to rotary controls for electrical instruments and the like and, more particularly, to a rotary control having a detent to enable the control to be stopped at several rotational positions as it is rotated.

BACKGROUND OF THE INVENTION

Rotary controls for electrical instruments and other equipment have generally been designed either to be continuously variable or to have a single set of rotational stop positions provided by permanent detents. These controls are dedicated to a single function which is best carried out either in discrete steps or continuously.

Sophisticated instruments such as the current generation of oscilloscopes, however, now offer the operator the ability to select among several functions for a rotary control. It is desirable, therefore, to provide for such instruments a rotary control suitable for different functions, one that is both continuously variable and has one or more selectable detents. Each detent can provide a different set of predetermined rotational stop positions that correspond to a different control function or to different gradations of the same function. The continuously variable feature can permit the control to be adjusted to an arbitrary position.

Rotary controls are known to exist that have two rotary components, one component having detents and the other being continuously variable for fine tuning. But a single rotary control that combines both features is not known to exist.

SUMMARY OF THE INVENTION

Therefore, it is an object of the invention to provide a rotary control that is both continuously variable and has selectably variable detents.

It is another object of the invention to provide such a control in which the detents can be selected electronically.

To achieve these objects, a rotary control according to the invention includes a manually rotatable shaft on which a plate is coaxially mounted, the plate having a plurality of radially extending magnetizable flutes. Spaced adjacent to the perimeter of the plate is a switchable magnetic detent means such as an electromagnet. A control means in the form of a switch is actuatable by an operator to energize selectably the detent means and thereby engage the detent means successively to the magnetizable flutes as the shaft is manually rotated, the rotary control stopping at rotational stop positions corresponding to each flute. The control means also de-energizes the detent means to enable the rotary control to be continuously variable.

The number and angular spacing of the stop positions of the rotary control is increased by coaxially mounting on the shaft a number of plates, with the flutes of each plate axially offset from the flutes of other plates or angularly spaced a different spacing apart. Associated with each plate is a switchable detent means in communication with the control means. By selecting a desired detent means through the control means, stop positions suitable to a specific function are provided. The control means can also control a graduated scale keyed to each detent means.

Vernier adjustment is added to the rotary control by positioning a number of electromagnetic detent means around a plate. The angular spacing between detents differs from the angular spacing between flutes of a plate so that energizing a selected detent means changes the stop positions of the rotary control. More than one detent means can also be energized to change selectably the angular spacing between stop positions. The multiple detents may take the form of a metallic ring having an electromagnet for each detent. The control means selectably energizes an electromagnet as a single detent. To strengthen magnetic resistance to rotation of the shaft, several of the electromagnets may be spaced in a set to simultaneously engage flutes. The control means can then energize the set of electromagnets simultaneously.

The foregoing and other objects, features, and advantages of the invention will become more apparent from the following detailed description of preferred embodiments which proceeds with reference to the accompanying drawings.

BRIEF DESCRIPTION OF THE DRAWINGS

FIG. 1 is a pictorial view of a rotary control having a selectably variable detent according to the invention.

FIG. 2 is a pictorial view of the rotary control with several detents.

FIG. 3 is a pictorial view of another embodiment of the rotary control.

DETAILED DESCRIPTION

A rotary control 10 according to the invention is shown in FIG. 1, situated within an instrument 12 such as an oscilloscope. The control 10 comprises a manually rotatable shaft 14 to which a disk-shaped plate 16 is coaxially mounted. Plate 16 has a plurality of magnetizable flute members 18 extending radially therefrom. Flute members 18 are shown located at a uniform angular spacing, but they can be spaced arbitarily, depending on the intended use of the control. A switchable magnetic detent means such as an electromagnet 22 is spaced sufficiently close to the perimeter of the plate 16 to bring the flutes 18 within the influence of the magnetic field of the detent means. The electromagnet 22 is energized and de-energized by a control means such as a switch 24 actuated by an operator. When energized, the electromagnet 22 attracts and holds each flute 18 as the shaft 14 is rotated to bring each flute successively within the field of the electromagnet. The control 10 is thus provided by the electromagnet 22 with a number of rotational stop positions equal to the number of flutes 18. When the electromagnet is de-energized, no magnetic field is present. The shaft is freely rotatable so that the control 10 is continuously variable.

As in a conventional rotary control, the shaft 14 is mounted on bearings (not shown) and extends from the instrument panel 26 to a device 28 within the instrument responsive to the rotational position of the rotary control 10. A knob 30 is mounted on an end of the shaft at the front of the instrument panel 26 for the operator to manually rotate the shaft 14. The device 28, mounted on the opposite shaft end, may be of any conventional type including a shaft encoder that digitizes the angle of the rotation of a shaft 14 and provides a digital signal encoding that information for control of the instrument 12. The rotational stop positions of the shaft 14 correspond to the flutes 18 on the plate 16. For example, if the control 10 were scaled from zero to one hundred, it may be desirable to have ten flutes, each flute corresponding to a decade stop position.

The electromagnet 22 forming the detent is of conventional design, including a core 32 of magnetic material surrounded by a coil of wire 34 through which a current is passed by switch 24 to magnetize the core. With the electromagnet 22 energized, it produces a magnetic field that magnetically engages the flutes 18 as they are brought into proximity of the electromagnet by rotation of shaft 14. The magnetic engagement of a flute 18 to the electromagnet 22 stops the rotary control 10 at each rotational stop position. Shaft 14 resists further rotation beyond each stop position until sufficient torque is applied to the knob 30 by the operator to overcome the resistance of the magnetic engagment. Further rotation of the knob brings successive flutes 18 into magnetic engagement with electromagnet 22. With electromagnet 22 de-energized, it produces no magnetic field to detain the flutes 18 and the shaft is freely rotatable.

Different detents are created by angularly spacing a number of electromagnets 22, 222 close to the perimeter of plate 16. FIG. 2 shows one embodiment of multiple electromagnets 22, 222 mounted around the inside of a magnetizable ring 36, with the shaft 14 extending therethrough. Each electromagnet is formed by a wire 38 wound around a core 40 that extends radially inward of the ring 36. The angular spacing between the cores 40 differs from the angular spacing between flutes 18 on the plate 16 to form different detents. Each of the detents has a unique set of separate, associated stop positions. In a variation of the spacing, several of the electromagnets 22, 222 may be spaced and energized simultaneously to engage several flutes 18, thereby providing the shaft 14 with greater magnetic resistance to rotation than provided by a single electromagnet. The wires 38 from the cores 40 are connected to a control switch 224 which can selectably energize a desired electromagnet 22 or set of electromagnets 22, 222.

Additional detents are also provided by mounting a plurality of plates 16, 316 on the shaft 14, as shown in FIG. 3, each plate with an associated electromagnet 22, 322. The flutes 18 of plate 16 are offset from the flutes 318 on plate 316 as viewed along the axis of shaft 14. The angular spacing between flutes 18 on plate 16 can also differ from the angular spacing between flute members 318 on plate 316. With such an arrangement, the location of the stop positions for the rotary control 10 are varied by selecting a different plate. This selection is made at the switch 324, which is used to select the desired set of stop positions by energizing the appropriate electromagnet. As with the single plate 16 in FIG. 1, the switch 324 can de-energize the electromagnets 22, 322 to enable the rotary control 10 to be continuously variable.

The operation of the rotary control 10 is similar in all embodiments, with reference to FIG. 1 as an example. With the rotary control 10 as part of an oscilloscope, it may be used for several functions, such as measuring volts or time per division or changing focus or intensity. The switch 24 selects the function by transmitting a signal to conventional selecting circuitry 41 and energizing an electromagnet 22 corresponding to the selected function. For a continuously variable function such as focus, no electromagnet 22 is energized so that the rotary control is continuously variable. The switch 24 also can activate a scale 42 which displays the value and type of controlled variable. In the case of an oscilloscope, the switch 24 can be located on a touch screen and the variable may be displayed on the cathode ray tube. Of course, it may also appear as a scale on an instrument panel in other instruments.

Having illustrated and described the principles of the invention in preferred embodiments, it should be apparent to those skilled in the art that the invention can be modified in arrangement and detail without departing from such principles.

I claim all modifications coming within the spirit and scope of the following claims:

1. A rotary control, comprising:
   a manually rotatable shaft;
   a first plate mounted on the shaft for rotation therewith, the plate having a plurality of spaced-apart magnetizable flute members extending therefrom, each flute member corresponding to a rotational stop position for the rotary control;
   a switchable magnetic detent means spaced adjacent the plate for positioning the flute members within influence of the magnetic field of the detent means; and
   a control means for selectably energizing the switchable magnetic detent means to magnetically engage each flute member successively as the shaft is rotated,
   the rotary control thereby having a detent and associated rotational stop positions with the detent means energized and being freely rotatable with the detent means de-energized.

2. The rotary control of claim 1 including a second plate mounted on the shaft, the angular spacing between flute members on the first plate differing from the angular spacing between flute members on the second plate, each plate having switchable magnetic detent means spaced adjacent each plate and in communication with the control means to enable the control means to energize selectably the detent means of each plate and thereby vary the rotational stop positions of the rotary control.

3. The rotary control of claim 2 further including a graduated scale keyed to each detent means.

4. The rotary control of claim 1 including a second plate mounted on the shaft, the flute members on the first plate axially offset from the flute members on the second plate, each plate having switchable magnetic detent means spaced adjacent each plate and in communication with the control means to enable the control means to energize selectably the detent means of each plate and thereby vary the rotational stop positions of the rotary control.

5. The rotary control of claim 1 in which the switchable magnetic detent means includes an electromagnet, and the control means includes a switch coupled to the electromagnet for selectably energizing and de-energizing the electromagnet.

6. The rotary control of claim 1 including a plurality of the switchable magnetic detent means angularly spaced adjacent the plate to vary the rotational stop positions of the rotary control.

7. The rotary control of claim 6 in which the angular spacing between detent means differs from the angular spacing between flute members.

8. A rotary control of claim 6 in which the plurality of detent means comprises a magnetizable ring means having a plurality of electromagnets, the control means selectably energizing an electromagnet on the ring to form a detent.

9. A rotary control for an instrument, the control comprising:
  a manually rotatable shaft;
  device means connected to the shaft for varying operation of the instruments in accordance with the rotational position of the shaft;
  a plate mounted on the shaft for rotation therewith, the plate having a magnetizable flute member extending therefrom and defining a circle when rotated about the shaft, the flute member corresponding to a rotational stop position of the rotary control;
  a switchable magnetic detent means spaced adjacent the plate for positioning the flute member within influence of the magnetic field of the detent means; and
  control means in communication with the switchable magnetic detent means for selectably energizing the magnetic detent means to magnetically engage the flute member as the shaft is rotated,
  the rotary control thereby having a detent and an associated rotational stop position with the detent means energized to vary the device means in discrete steps and being freely rotatable with the detent means de-energized to vary the device means continuously.

10. The rotary control of claim 9 including selecting circuitry in communication with the control means to enable the control means to select a function of the instrument in accordance with selection of the detent means.

11. A method of variably controlling at least two functions of an electrical instrument, comprising:
  providing a rotatable control including a manually rotatable shaft and a device means rotatable with the shaft for varying the functions in accordance with the rotational position of the shaft;
  providing electrically switchable detent means for yieldably engaging the shaft in discrete angular positions;
  controlling the detent means to select between engaging the shaft and disengaging the shaft, the disengagement enabling the shaft to be turned to vary the rotational position of the shaft continuously;
  selecting one of the functions for the device means to vary; and
  coupling the selecting step to the controlling step in accordance with a predetermined relationship between each selected function and control of the detent means.

12. The method of claim 11 including the following steps:
  providing the shaft with first and second sets of flutes extending radially therefrom, the flutes of the first set axially offset from the flutes of the second set;
  providing separate electrically switchable detent means for yieldably engaging each set of flutes in associated discrete angular positions;
  controlling the detent means to select among engaging the first set of flutes, engaging the second set of flutes, and disengaging both sets of flutes, the disengagement enabling the shaft to be turned to vary the rotational position of the shaft continuously;
  selecting one of the functions for the device means to vary; and
  coupling the selecting step to the controlling step in accordance with a predetermined relationship between each selected function and control of the detent means.

* * * * *